(12) United States Patent
Vanhee et al.

(10) Patent No.: US 12,732,045 B2
(45) Date of Patent: Sep. 8, 2026

(54) SYSTEMS FOR THERMAL MANAGEMENT OF A VEHICLE

(71) Applicant: Dana Automotive Systems Group, LLC, Maumee, OH (US)

(72) Inventors: Steven Vanhee, Hooglede (BE); Maarten Debrouwere, Zedelgem (BE); Carl Trudel, Boucherville (CA); Jaywant S. Pawar, Pune (IN); Alexandre Pare, Saint-Amable (CA)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 215 days.

(21) Appl. No.: 18/613,680

(22) Filed: Mar. 22, 2024

(65) Prior Publication Data

US 2024/0333054 A1 Oct. 3, 2024

Related U.S. Application Data

(60) Provisional application No. 63/492,368, filed on Mar. 27, 2023.

(51) Int. Cl.
*H02K 1/32* (2006.01)
*H02K 7/00* (2006.01)

(52) U.S. Cl.
CPC ............... *H02K 1/32* (2013.01); *H02K 7/003* (2013.01)

(58) Field of Classification Search
CPC ................................ H02K 1/32; H02K 7/003
See application file for complete search history.

(56) References Cited

U.S. PATENT DOCUMENTS 5,779,222 A * 7/1998 Hollingworth ......... F16K 39/06 251/283
2014/0333161 A1* 11/2014 Knoblauch ............. H02K 9/19 310/54
2020/0227964 A1* 7/2020 Ronning .................. H02K 1/32

* cited by examiner

*Primary Examiner* — Tulsidas C Patel
*Assistant Examiner* — Mohammed Ahmed Qureshi
(74) *Attorney, Agent, or Firm* — McCoy Russell LLP

(57) ABSTRACT

Systems are provided for a cooling system for an electric vehicle. In one example, a system includes a shaft assembly comprising a shaft, a shaft end cap, and an insert, wherein the insert is arranged in a cavity shaped by the shaft and the shaft end cap.

16 Claims, 9 Drawing Sheets

290
x
y
202
300
312
382
230
210
334
332
426 324
322
220

500
510
512
230
210
270
290
x
y
z 230
612
610
630

230
634
632

625

650

SYSTEMS FOR THERMAL MANAGEMENT OF A VEHICLE

CROSS REFERENCE TO RELATED APPLICATION

The present application claims priority to U.S. Provisional Application No. 63/492,368, entitled "SYSTEMS FOR THERMAL MANAGEMENT OF A VEHICLE", and filed on Mar. 27, 2023. The entire contents of the above-listed application are hereby incorporated by reference for all purposes.

TECHNICAL FIELD

The present description relates generally to a thermal management system of a motor shaft of a vehicle.

BACKGROUND AND SUMMARY

Vehicles may be equipped via electrical energy storage devices to decrease vehicular contributions to global warming. An electric motor may be configured to operate via electrical energy provided by the electrical energy storage device, wherein the electric motor may drive one or more wheels of the vehicle. Like an engine, the electric motor may demand cooling during certain operating conditions to control a temperature of components of the electric motor.

An efficiency of the electric motor may be at least partially based on an efficiency of the cooling provided to the electric motor and its components. Stator windings may represent one component in which previous examples of cooling may be insufficient. Other components which may demand enhancements in cooling may include the rotor, the motor shaft, and bearings of the motor.

In one example, the issues described above may be addressed by a system for a shaft assembly comprising a shaft, a shaft end cap, and an insert, wherein the insert is arranged in a cavity shaped by the shaft and the shaft end cap.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
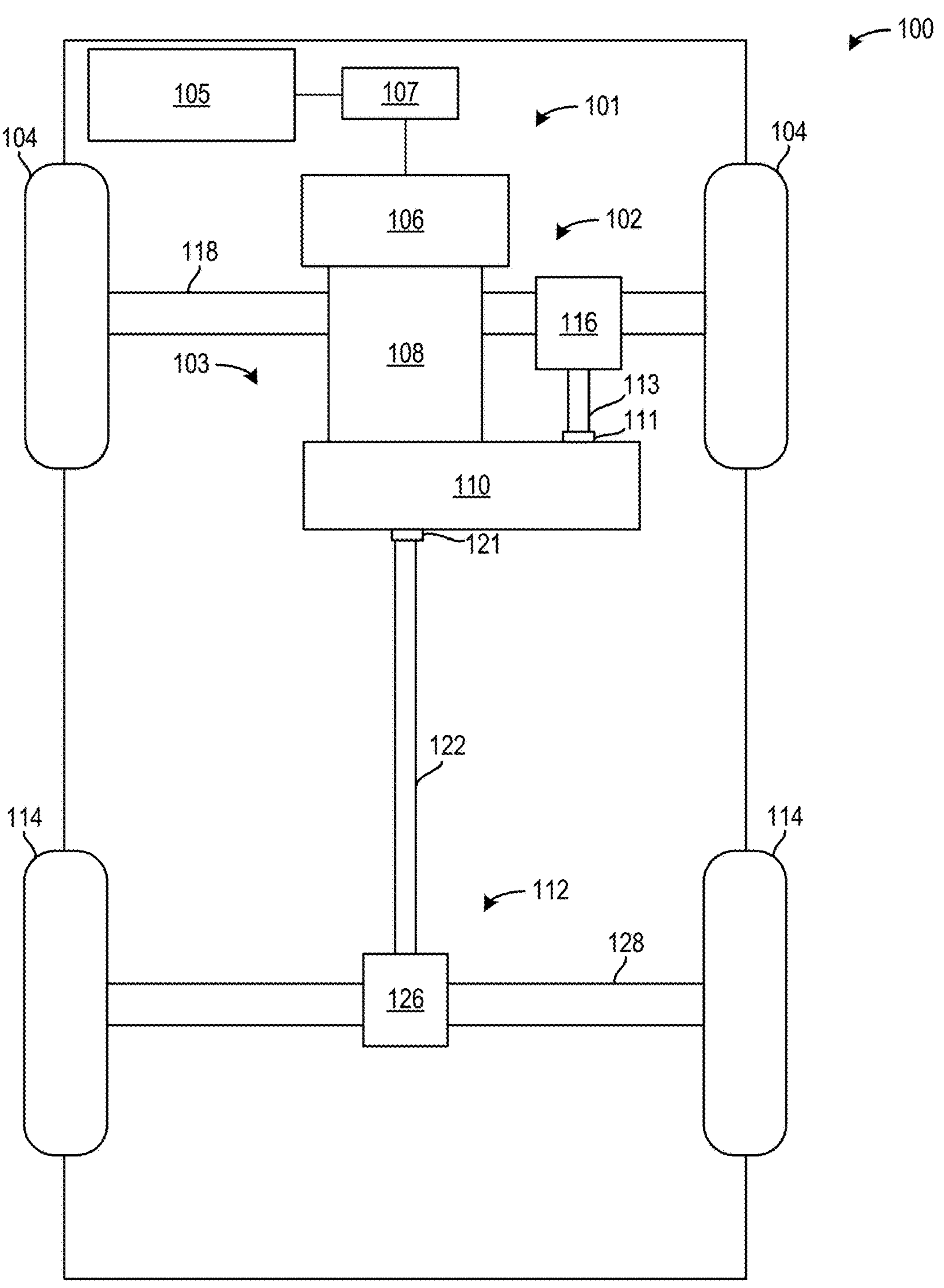
FIG. 1 is a schematic depiction of an example vehicle powertrain, according to an embodiment of the present disclosure.
Figure 2:
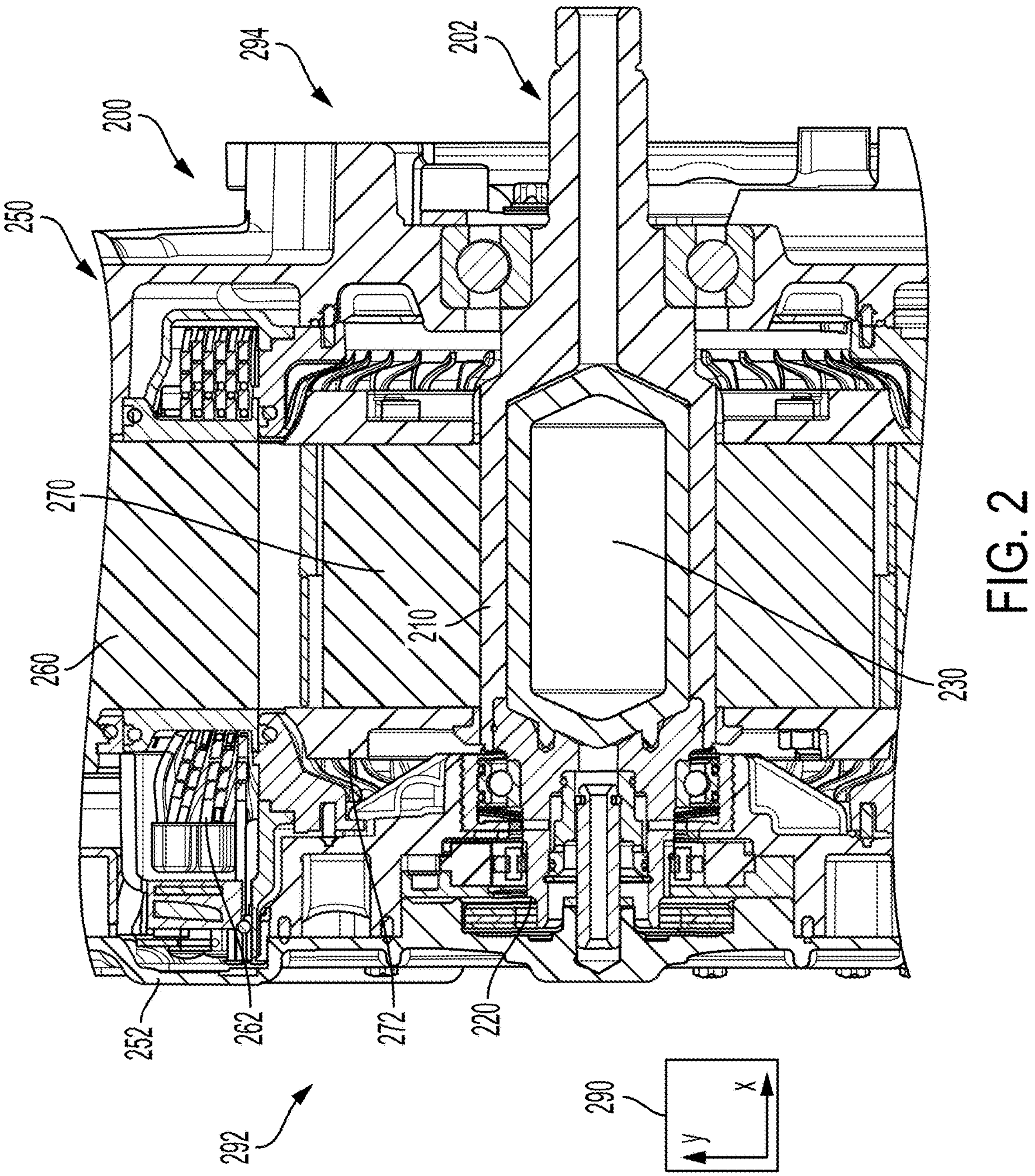
FIG. 2 is a schematic depiction of a motor of the vehicle powertrain, according to an embodiment of the present disclosure.
Figure 3:
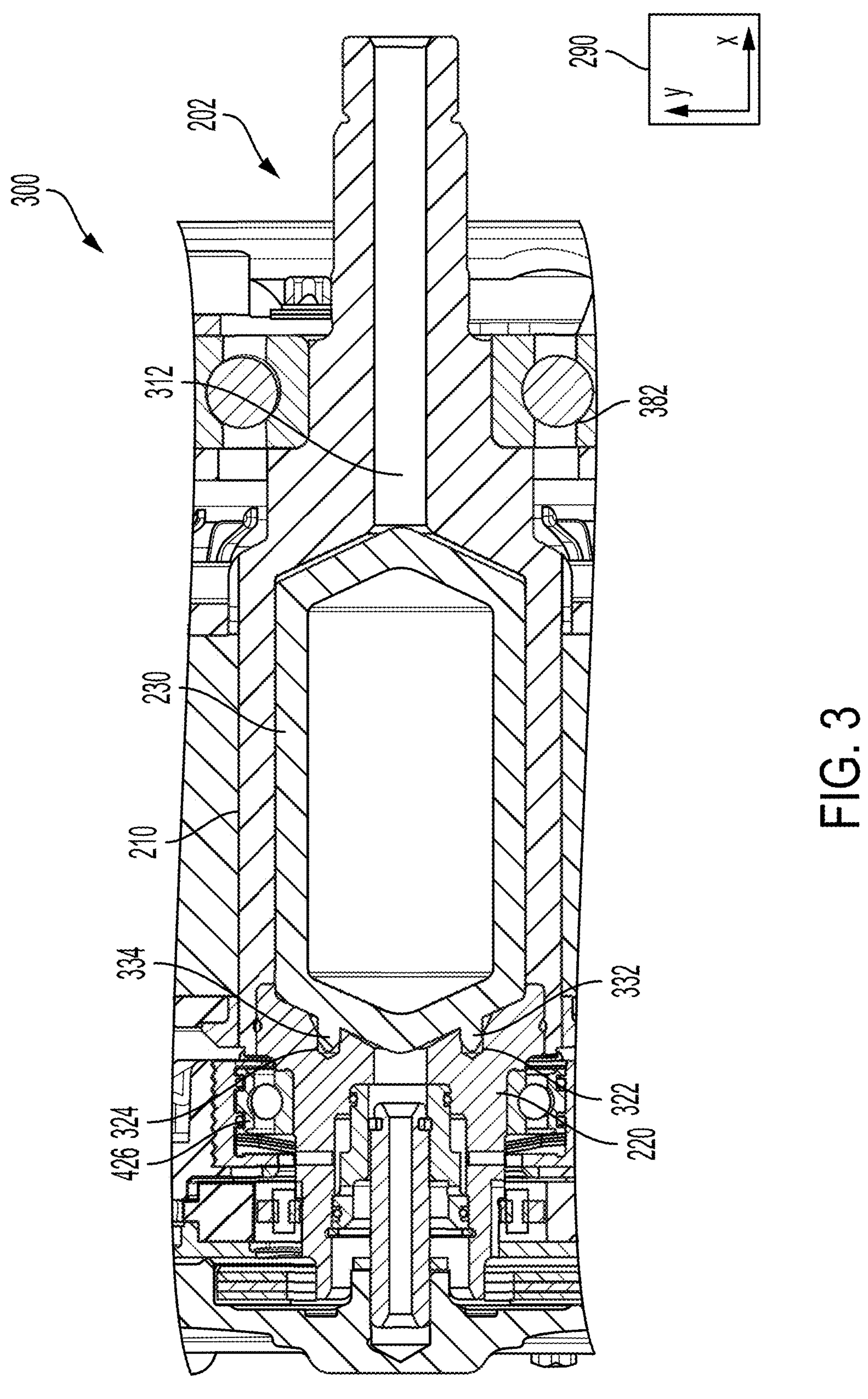
FIG. 3 is a depiction of a shaft of the motor, according to an embodiment of the present disclosure.
Figure 4:
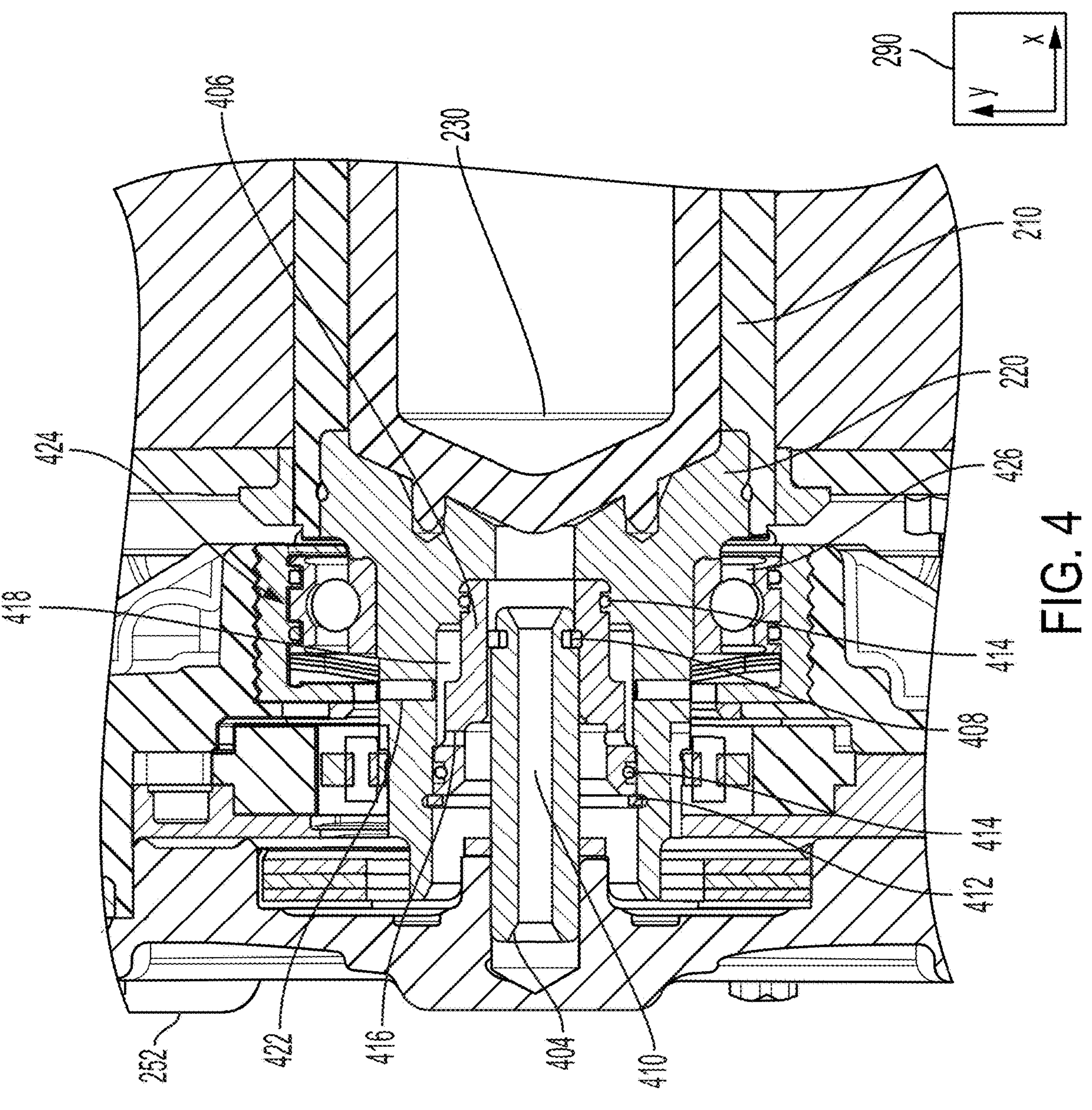
FIG. 4 is a depiction of an inlet of the shaft, according to an embodiment of the present disclosure.
Figure 5:
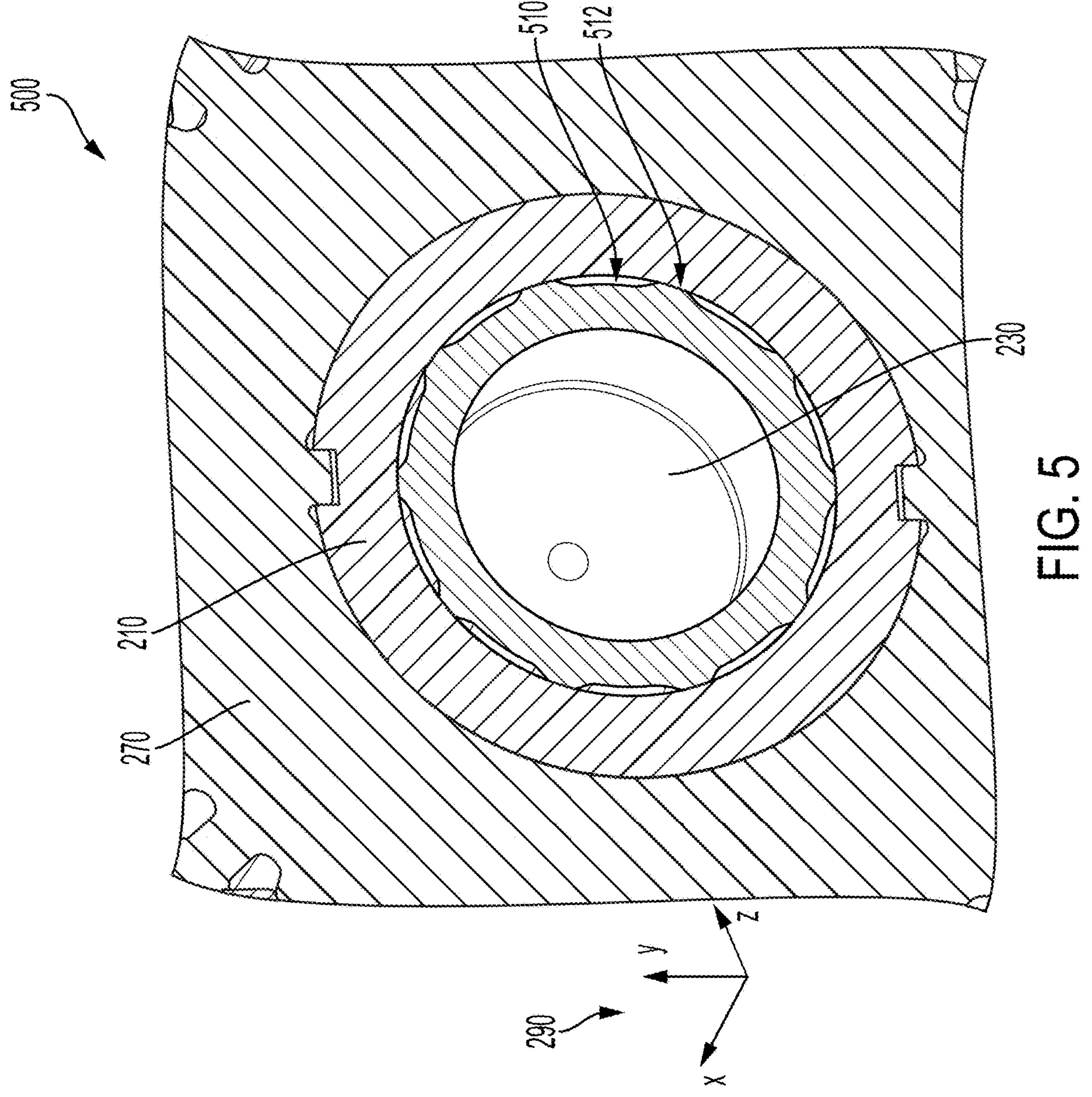
FIG. 5 is a perspective view of a shaft insert inserted into the shaft; according to an embodiment of the present disclosure.
Figure 6A:
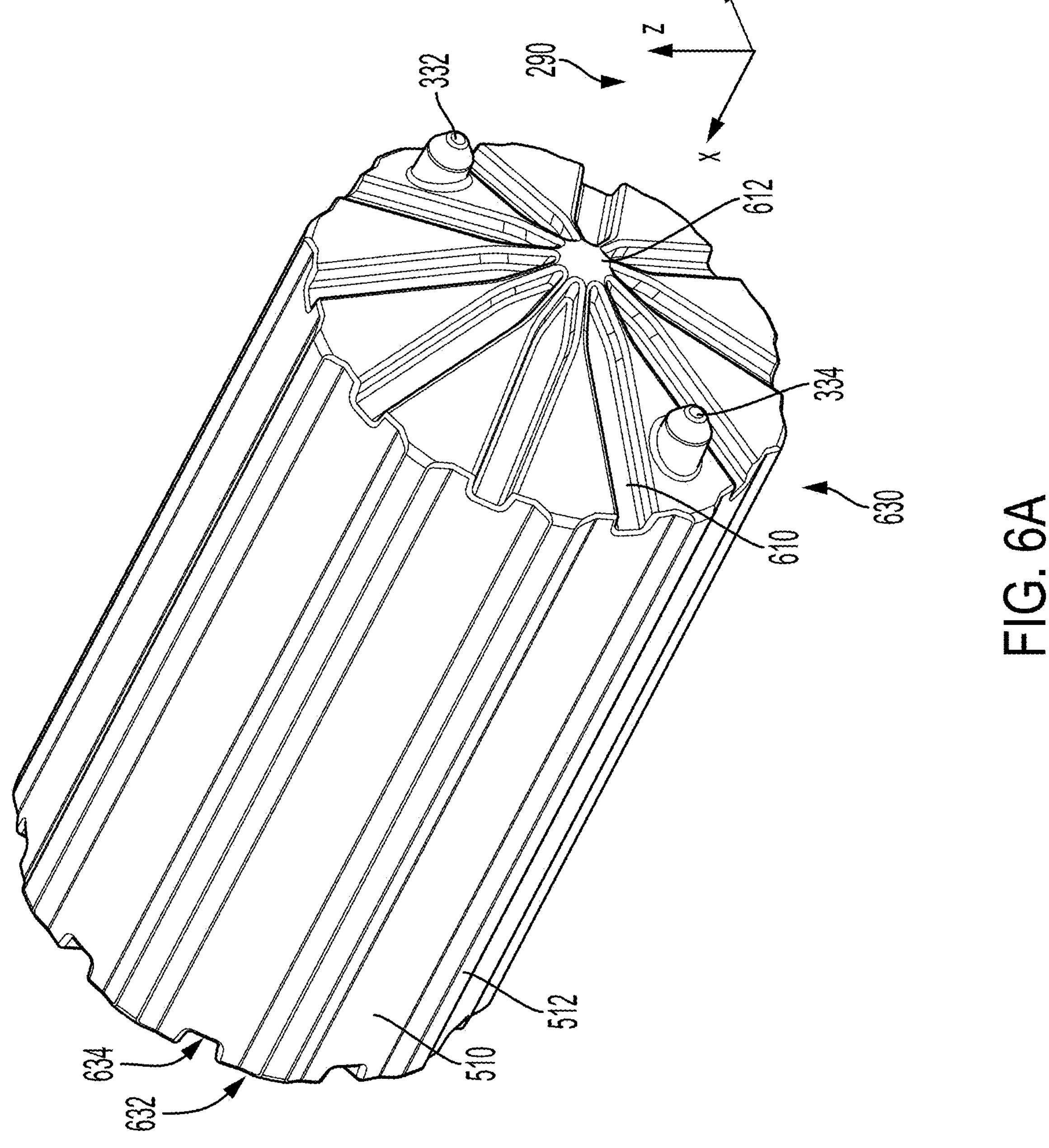
FIG. 6A is a view of the shaft insert, according to an embodiment of the present disclosure.
Figures 6B, 6C, 6D, 6E:
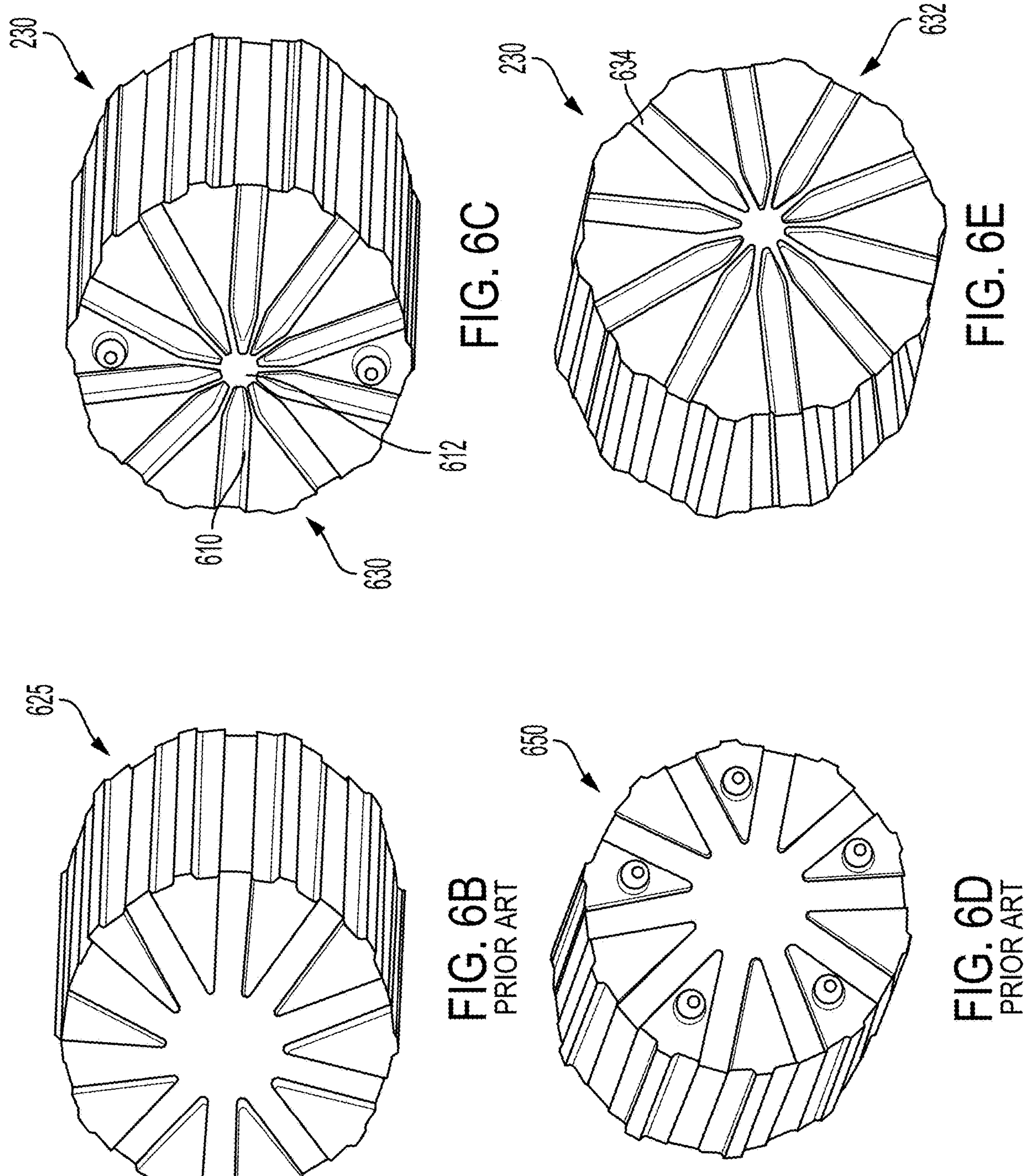
FIGS. 6B and 6C show a comparison of an inlet end of a prior art insert and the shaft insert of the present disclosure, respectively.
FIGS. 6D and 6E show a comparison of an outlet end of a prior art insert and the shaft insert of the present disclosure, respectively.
Figure 7A:
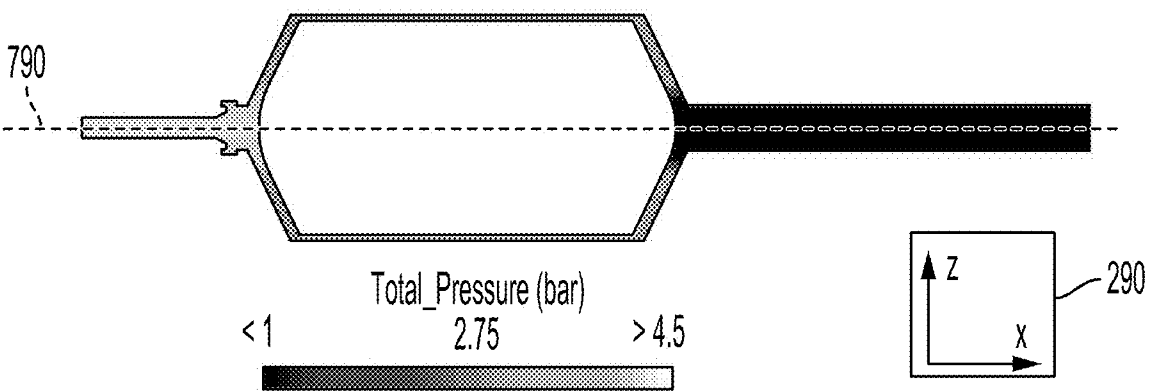
FIG. 7A shows a pressure change across a shaft insert of a prior art example.
Figure 7B:
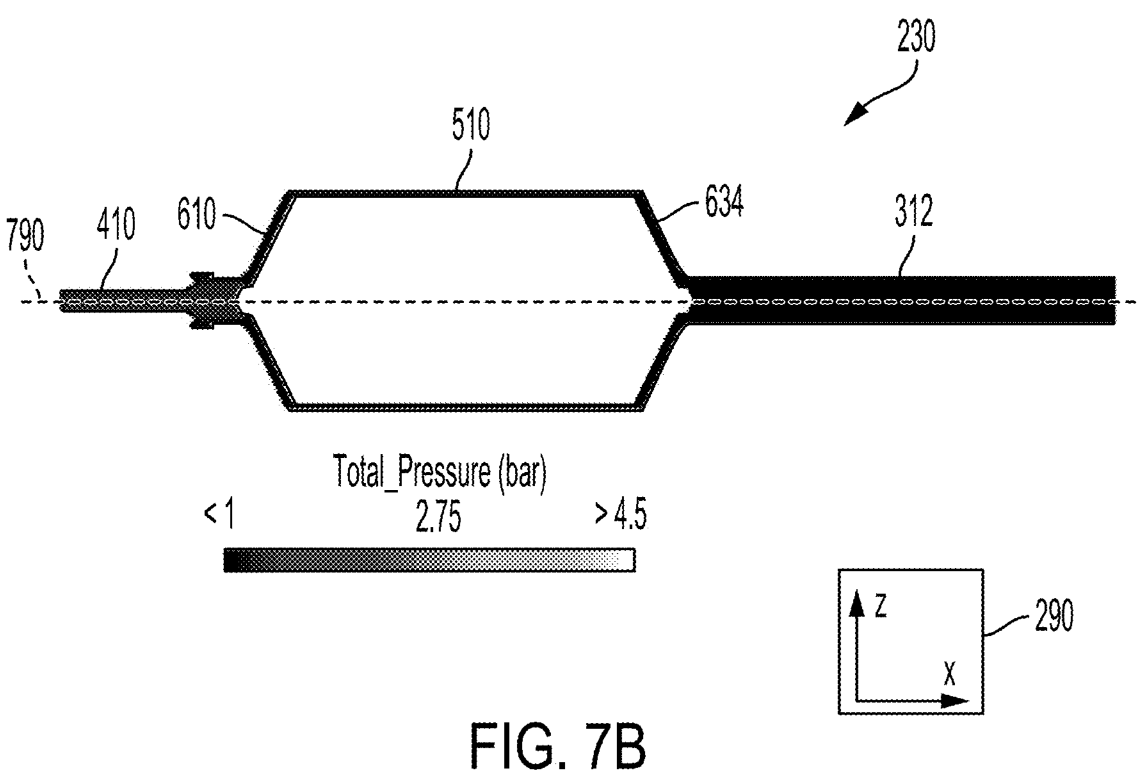
FIG. 7B shows a pressure change across the shaft insert, according to an embodiment of the present disclosure.
Figures 8A, 8B:
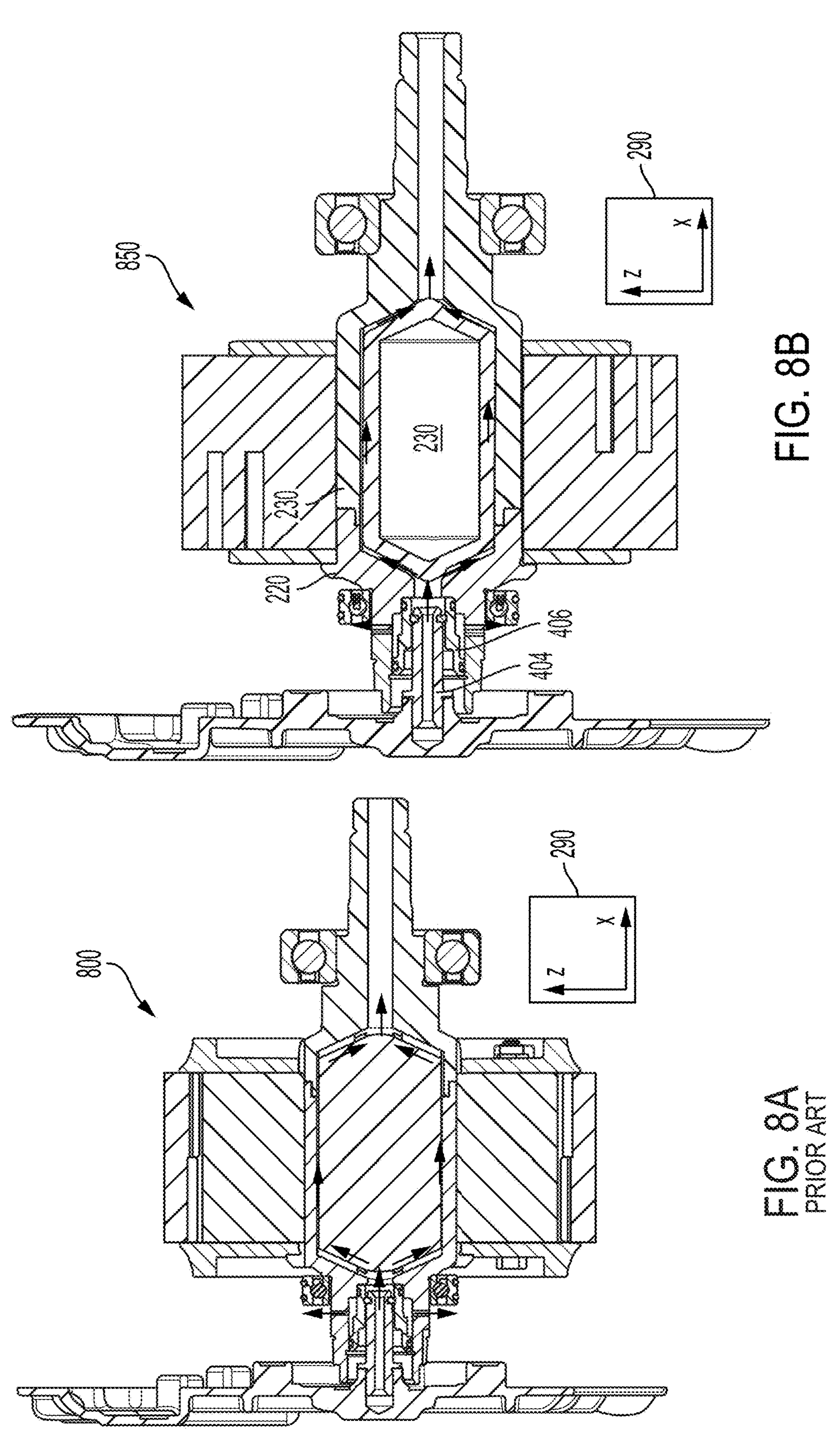
FIG. 8A shows a cross-section of a shaft and lubricant flow therethrough of the prior art.
FIG. 8B shows a cross-section of the shaft, according to an embodiment of the present disclosure.

The following description relates to systems for a cooling arrangement for a drive unit. In one example, the drive unit is an electric motor of a vehicle, as illustrated in FIG. 1. FIG. 2 is a schematic depiction of a motor of the vehicle powertrain, according to an embodiment of the present disclosure. FIG. 3 is a depiction of a shaft of the motor, according to an embodiment of the present disclosure. FIG. 4 is a depiction of an inlet of the shaft, according to an embodiment of the present disclosure. FIG. 5 is a perspective view of a shaft insert inserted into the shaft; according to an embodiment of the present disclosure. FIG. 6A is a view of the shaft insert, according to an embodiment of the present disclosure. FIGS. 6B and 6D show views of an insert according to a prior art example. FIGS. 6C and 6E shows views of the shaft insert of the present disclosure. FIG. 7A shows a pressure change across a shaft insert of a prior art example. FIG. 7B shows a pressure change across the shaft insert, according to an embodiment of the present disclosure. FIG. 8A shows a cross-section of a shaft and lubricant flow therethrough of the prior art. FIG. 8B shows a cross-section of the shaft, according to an embodiment of the present disclosure.

The present disclosure includes embodiments for a pressurized shaft cooling system with increased cooling performance as the fluid channels are located close to the rotor laminations and magnet. In one example, the fluid channels are located closer to the rotor laminations and magnet than a prior art example shown in FIG. 7A, while the channels of both may be located at a similar radial location. The cooling system is fully enclosed so that fluid may not enter the rotor cavity. Therefore, no additional windage losses are introduced in the motor air gap. Pressurized lubricant may be used further downstream. The pressure shaft cooling system may include a multi-piece shaft design with a polymer insert for reducing the overall weight of the shaft. The shaft insert may be configured to decrease the shaft drag losses via a small axial passage height to reduce oil churning loss. The shaft may be further configured to decrease the speed dependency of the pressure drop via symmetric radial passages on an inlet and outlet side of the insert.

FIGS. 1-6A, 6C, 6E, 7B, and 8B show example configurations with relative positioning of the various components of the present disclosure. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a “top” of the component and a bottommost element or point of the element may be referred to as a “bottom” of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being “substantially similar and/or identical” differ from one another according to manufacturing tolerances (e.g., within 1-5% deviation). FIGS. 2-6E, 7A, and 7B are shown approximately to scale, however, other dimensions may be used if desired.

Turning now to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The motor 105 may include a variety of components and circuitry with thermal demands that effect an efficiency of the motor. As will be described herein, the motor 107 may include a cooling arrangement configured to meet the thermal demands of the components of the motor 107 while decreasing a packaging size thereof. The cooling arrangement of the motor 107 is described in greater detail with respect to FIGS. 2-3B herein.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications. In one example, the vehicle 100 is an electric vehicle.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

Turning now to FIG. 2, it shows an embodiment of a motor assembly 200. The motor assembly 200 may include a stator 260 and a rotor 270. The stator 260 may include end windings 262 arranged at opposite ends thereof. The rotor 270 may include rotor end caps 272 that interface with a portion of a rotor shaft assembly 202. The rotor 270 may be positioned radially outside of the rotor shaft assembly 202.

An axis system 290 is shown including an x-axis parallel to an axial direction and a y-axis parallel to a vertical direction. A radial direction is parallel to a plane including the y-axis and a third axis normal to the x- and y-axes. The motor assembly 200 may include a first side 292 and a second side 294. The second side 294 may be opposite the first side 292. In one example, the first side 292 is an inlet side and the second side 294 is an output side of the motor assembly 200, wherein power from the motor assembly 200 is transferred to a transmission, gearbox, wheel, or other device at the second side 294.

The rotor shaft assembly 202 may include three main parts including a front side portion 210, a rear side portion 220, and shaft insert portion 230. In one example, the front side portion 210 and the rear side portion 220 may define a shaft main body. The shaft main body may rotate about an axis of rotation parallel to the x-axis based on an operation of the rotor 270. The shaft insert portion 230 may be arranged in a cavity within the front side portion 210, wherein the cavity may be sealed via the rear side portion 220. FIG. 3 shows a more detailed view 300 of the cross-section illustrated in FIG. 2. FIG. 4 shows an additional view of the system.

The front side portion 210 is a moveable component. Herein, the front side portion 210 is interchangeably referred to as a shaft 210 and the rear side portion 220 is interchangeably referred to as a shaft end cap 220. The shaft insert portion 230, interchangeably referred to herein as insert 230, may be fixedly held within the cavity of the shaft 210. In one example, the shaft end cap 220 and the shaft 210 house the insert 230. The insert 230 may include a first protrusion 332 and a second protrusion 334.

The first protrusion 332 and the second protrusion 334 may interface with a first slot 322 and a second slot 324, respectively, of the shaft end cap 220. The first slot 322 may be shaped complementarily to the first protrusion 332 and the second slot 324 may be shaped complementarily to the second protrusion 334. In one example, the first protrusion 332 and the second protrusion 334 include a cylindrical shape with a domed tip. The first slot 322 and the second slot 324 may include a frustoconical shape. The insert 230 is shown in greater detail with respect to FIGS. 5 and 6.

A shaft passage 312 may extend from the second side 294 to the first side 292. Fluid may flow from a lance 404, through the shaft end cap 220, radially around the insert 230, and into the shaft passage 312. The lance 404 and other features of the rotor shaft assembly 202 are shown in greater detail with respect to FIG. 4. In one example, the lance 404 is stationary and immovable.

The lance 404 may insert into a housing 252 of the electric motor 250 and into a rotating inlet insert 406. The rotating inlet insert 406 may be arranged between the lance 404 and the shaft end cap 220. A seal 408 is arranged between the lance 404 and the rotating inlet insert 406. The seal 408 may include a square cross-sectional shape. The seal 408 may be configured with an opening to a determined size to control the oil leakage flow to the bearings 426.

In one example, the lance 404, the rotating inlet insert 406, and the shaft end cap 220 are concentric, wherein the lance 404 is interior to the rotating inlet insert 406, and the rotating inlet insert 406 is arranged interior to the shaft end cap 220.

The rotating inlet insert 406 may be spaced away from the insert 230 via a body of the shaft end cap 220. Thus, in one example, the shaft end cap 220 may include a U-shape or similar shape wherein arms of the shaft end cap 220 surround the lance 404 and the rotating inlet insert 406 and a body, coupled to the arms, physically separates the rotating inlet insert 406 from the insert 230.

An axial passage 410 may be arranged in the lance 404. The axial passage 410 may direct fluid toward the insert 230. As such, the axial passage 410 may also extend through the rotating inlet insert 406 and the shaft end cap 220 toward a center of the insert 230.

A snap ring 412 and one or more O-rings 414 may position the rotating inlet insert 406 into the space between the lance 404 and the shaft end cap 220. The snap ring 412 may block movement of the rotating inlet insert 406 along the x-axis and the O-rings 414 may center the rotating inlet insert 406 relative to the lance 404 and the shaft end cap 220.

The rotating inlet insert 406 may include a plurality of radial passages 416. The plurality of radial passages 416 may be arranged between the O-rings 414. The plurality of radial passages 416 may direct lubricant toward a plurality of shaft end cap radial passages 422. The plurality of shaft end cap radial passages 422 may direct lubricant to a bearing cavity 424 that is positioned radially outside of and adjacent to the shaft end cap 220. The plurality of radial passages 416 may be radially offset with the plurality of shaft end cap radial passages 422. An inner bearing race cavity 418 may fluidly couple the plurality of radial passages 416 to the plurality of shaft end cap radial passages 422. The inner cavity 418 may provide additional lubrication and/or cooling to an inner race of a bearing 426 in the bearing cavity 424. This may be due to centrifugal forces that force the oil to form a small oil film and provide extra cooling of the bearing inner race.

The plurality of radial passages 416 leading from and to the plurality of shaft end cap radial passages 422 are symmetric to promote centrifugal pressure recovery at high speeds. Radial passages 416 extend towards the shaft center to reduce incidence losses on both the lance 404 and the rotating inlet insert 406.

As illustrated in FIG. 3, the insert 230 may be positioned axially between the bearings 426 and shaft support bearings 382. The bearings 426 may be spaced away from the shaft 210 and support the shaft end cap 220. The shaft support bearings 382 may be positioned at an opposite end of the shaft 210 relative to a location of the shaft end cap 220. The shaft support bearings 382 may be in direct contact with the shaft 210.

The static lance may receive lubricant from a rear of the housing 252 of the motor and flow the lubricant to the rotating inlet insert 406. The axial passage 410 may extend through each of the lance 404, the rotating inlet insert 406, and the shaft end cap 220, to flow lubricant to the insert 230. The lubricant may flow to the plurality of radial passages, which may guide the lubricant to the plurality of outer passages, thereby cooling the first portion of the shaft. The lubricant may exit the plurality of outer passages and enter a plurality of second radial passages 634 at a second conical end of the insert 230, wherein the lubricant may flow to the shaft passage 312 of the first portion, aligned alone a shaft axis with the central passage of the static lance and rotating insert.

In one example, the pressurized shaft cooling system of FIGS. 2-6A, 6C, 6E, 7B, and 8B increase a cooling performance via the cooling channels being proximal to rotor laminations and magnets. The lubricant is guided to an inner shaft surface adjacent to a bearing of the motor. A fraction of the lubricant is guided through the rotating seal towards the inner shaft surface adjacent to the rear bearing of the motor. Centrifugal forces may generate an oil film and provide increased cooling to a bearing inner race. The lubricant may then be guided to a bearing cavity to lubricate the bearings via the plurality of radial passages.

Multiple outer passages 510 are shaped between the shaft 210 and the insert 230, as shown in cross-sectional view 500 of FIG. 5. The outer passages 510 are located close to an outer diameter (OD) of the shaft end cap 220 and increase cooling of the shaft 230. The height of the outer passages 510 may be shaped to limit internal churning loss of the oil. That is to say, the height of the outer passages 510 is configured to a determined height, measured in the radial direction, to minimize internal churning losses while providing desired lubricant flow rates and demanded cooling. The shaft insert 230 may further include a plurality of protrusions 512 arranged between neighboring outer passages 510. The plurality of protrusions 512 may be in face-sharing contact with an inner diameter of the shaft 210. Lubricant may flow through the plurality of outer passages 510 and contact the inner diameter of the shaft 210 before flowing toward the shaft passage 312 of FIG. 3.

The shaft insert 230 may be hollow and lubricant does not flow through the hollow region, wherein the hollow region reduces a weight of insert. Lubricant channels are formed between the shaft 210 and the shaft insert 230. The outer passages 510 and lubricant flow around the shaft insert 230 is shown in FIG. 8B along with a comparison of the shaft insert 230 of the present disclosure relative to an insert of a prior art example.

In one example, the embodiments of FIGS. 2-5 illustrate the insert 230 arranged in a cavity shaped between a first portion (e.g., the shaft 210) and a second portion (e.g., the shaft end cap 220) of the shaft assembly 202. The insert 230 may include a cylindrical shape wherein the plurality of outer passages is arranged on an outer diameter of the insert 230. In one example, an outer radial protrusion is arranged between neighboring outer passages such that the outer radial protrusions and the plurality of outer passages alternate. The plurality of outer passages may be size and shaped based on a lubricant demand in combination with churning losses. The insert may include a ceramic, metal, plastic, stone, cast iron, steel, stainless steel, carbon fiber, magnesium, aluminum, or other material. In one example, the insert includes a polymer thermoplastic material.

As shown in FIG. 6A, the insert 230 may further include conical ends, including a conical front end 630 which faces the shaft end cap 220 and includes the plurality of anti-rotation features. The insert 230 may further include a conical rear end 632, opposite the conical front end 630, wherein each of the conical front end 630 and the conical rear end 632 include a conical shape. The conical front end 630 is symmetric. The conical rear end is symmetric. As illustrated in FIGS. 2-3, the insert 230, including the front end 630, the rear end 632, and its cylindrical body may include a decagon cross-sectional shape. The insert 230 may be hollow. Fluid may flow along the outer surfaces of the insert 230 in a shape and direction illustrated in FIG. 7B.

The front end 630 may include a plurality of first radial passages 610 that extend from a center of the front end 630 to centers of the plurality of outer passages 510. In one example, each of the plurality of first radial passages 610 may extend to a center of a corresponding outer passage of the plurality of outer passages 510. In one example, a number of the plurality of first radial passages 610 may be equal to a number of outer passages 510.

The rear end 632 may include a plurality of second radial passages 634 that extend from the plurality of outer passages 510 to a center of the rear end 632. The plurality of radial passages of the rear end 632 may be fluidly coupled to the shaft passage 312 as shown in FIG. 3. In this way, the insert 230 may be symmetric.

FIG. 6B shows a view 625 of an inlet side of a prior art example of an insert. As illustrated, radial passages thereof originate further from a center of the insert relative to the plurality of first radial passages 610 of the shaft insert 230. A detailed view of the front end 630 of the shaft insert 230 is shown in FIG. 6C. As shown in FIG. 6C, the plurality of first radial passages 610 extend from a center of the shaft insert 630 to an outer diameter of the shaft insert.

The center may include a nose 612 that protrudes toward a lance side of the motor. The plurality of first radial passages 610 extend from the nose 612 of the shaft insert 230. As such, the nose 612 of the shaft insert 230 and the plurality of first radial passages 610 extend toward an oil inlet of the electric motor.

The nose 612 is shaped as truncated cone with domed end to guide the fluid flow towards the first radial passages 610 and reduce incidence losses compared to the prior art example of FIG. 6B.

FIG. 6D shows a view 650 of an outlet side of the prior art example of the insert. As illustrated, the radial passages thereof originate further from a center of the insert relative to the plurality of second radial passages 634 of the shaft insert 230, as shown in FIG. 6E. By arranging the plurality of first radial passages 610 and the plurality of second radial passages 634 closer to the center of the shaft insert 230 relative to the prior art example, a pressure drop across the shaft insert 230 is decreased. A significant portion of the centrifugal forces on the fluid can be recuperated resulting in a decreased pressure drop across the shaft fluid passage 410.

FIG. 7A illustrates an example pressure contour plot of cross section though lubricant flow paths for the prior art example. As shown, an inlet pressure is relatively high compared to an outlet pressure, which may be attributed to the increased hydraulic loss in the system compared to the present disclosure shown in FIG. 7B. As shown in FIG. 7B, the pressure drop across the shaft insert 230 is relatively low, which may lower the hydraulic losses in the system. An axis of rotation 790 is shown in both FIGS. 7A and 7B. An axial passage 410 lubricant flow path is not rotating as it is part of static lance, whereas lubricant flow paths 610, 510, 634 and 312 are rotating with shaft speed.

Turning now to FIGS. 8A and 8B, they show example lubricant flow paths 800 and 930 through an insert of the prior art and the shaft insert 230 of the present disclosure, respectively. In the view 800, the insert is further from a lance relative to the insert 230 in the view 850. The extension of the plurality of radial passages toward the center of the shaft insert 230 may enhance lubricant flow through the outer passages and around the insert 230.

The disclosure provides support for a system including a shaft assembly comprising a shaft, a shaft end cap, and an insert, wherein the insert is arranged in a cavity shaped by the shaft and the shaft end cap, the insert comprising a plurality of radial passages at an inlet end that extend from a center of the insert to an outer diameter. A first example of the system optionally includes where the insert comprises conical ends comprising the plurality of radial passages, wherein the plurality of radial passages is fluidly coupled to a plurality of outer passages arranged on the outer diameter of the insert, between the conical ends, and wherein the center protrudes toward an inlet of the shaft assembly. A second example of the system, optionally including the first example, further includes a lance and a rotating inlet insert, wherein the lance is static and supported by a housing of an electric motor and the rotating inlet insert is supported by the lance and the shaft end cap. A third example of the system, optionally including one or more of the previous examples, further includes where the shaft assembly is an electric motor shaft assembly. A fourth example of the system, optionally including one or more of the previous examples, further includes where the plurality of radial passages is a plurality of first radial passages, further comprising a plurality of second radial passages at an outlet end of the insert, wherein the plurality of second radial passages extend from the outer diameter to the center of the insert. A fifth example of the system, optionally including one or more of the previous examples, further includes where the inlet end and an outlet end of the insert are symmetric. A sixth example of the system, optionally including one or more of the previous examples, further includes where the insert comprises a circular cross-sectional shape with multiple rectangular slots along its outer perimeter, the insert further comprises a nose at the center of the insert, the nose comprises a truncated cone shape with a domed end. A seventh example of the system, optionally including one or more of the previous examples, further includes where the insert comprises a plurality of outer passages extending in an axial direction, a height of the plurality of outer passages is less than a width of the plurality of outer passages.

The disclosure provides additional support for a system including an electric motor comprising a housing, a stator arranged in the housing and surrounding a rotor, a shaft arranged in the housing and at least partially surrounded by the rotor, wherein the shaft comprises an insert arranged therein, the insert comprising a plurality of radial passages extending from a center of the shaft to an outer diameter of the shaft, and a shaft end cap pressed against an end of the shaft at which the insert is arranged, the shaft end cap comprising an axial passage configured to direct lubricant to the insert. A first example of the system further includes where the axial passage further extends through an inlet insert and a lance. A second example of the system, optionally including the first example, further includes where the lance is supported by the housing and the inlet insert is supported by the shaft end cap. A third example of the system, optionally including one or more of the previous examples, further includes where a square seal is used to seal the lance from the inlet insert, wherein a space is arranged between the square seal, the lance, and the inlet insert configured to flow lubricant from the axial passage to the plurality of radial passages of the inlet insert. A fourth example of the system, optionally including one or more of the previous examples, further includes where the plurality of radial passages flow lubricant to an inner race bearing cavity fluidly coupled to a plurality of shaft end cap radial passages. A fifth example of the system, optionally including one or more of the previous examples, further includes where the plurality of shaft end cap radial passages direct lubricant to a bearing in contact with the shaft end cap. A sixth example of the system, optionally including one or more of the previous examples, further includes where the insert comprises a first conical end with a plurality of first radial passages of the plurality of radial passages and a second conical end, opposite the first conical end, with a plurality of second radial passages of the plurality of radial passages, the insert further comprises a plurality of outer passages fluidly coupled to the plurality of first radial passages and the plurality of second radial passages.

The disclosure provides further support for a system for an electric motor including a shaft, a shaft end cap, and an insert housed via the shaft and the shaft end cap, the insert comprising a plurality of passages arranged along its outer surfaces configured to direct lubricant from the shaft end cap to a shaft passage arranged in the shaft, the insert further comprising a plurality of radial passages extending from the plurality of passages to a center of the insert. A first example of the system further includes where a lance and a rotating inlet insert, wherein the lance is supported by a housing of the electric motor and the rotating inlet insert is supported by the lance and the shaft end cap, wherein an axial passage extends through the lance, the rotating inlet insert, and the shaft end cap. A second example of the system, optionally including the first example, further includes where the insert comprises a first protrusion that interfaces with a first slot of the shaft end cap, the insert further comprises a second protrusion that interfaces with a second slot of the shaft end cap, wherein the first protrusion and the second protrusion are configured to block rotation of the insert. A third example of the system, optionally including one or more of the previous examples, further includes where the insert comprises a decagonal cross-sectional shape. A fourth example of the system, optionally including one or more of the previous examples, further includes where the insert is arranged between a bearing supporting the shaft end cap and a bearing supporting the shaft.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:

a shaft assembly comprising a shaft, a shaft end cap, and an insert, wherein the insert is arranged in a cavity shaped by the shaft and the shaft end cap, the insert comprising a plurality of radial passages at an inlet end that extend from a center of the insert to an outer diameter; and a lance and a rotating inlet insert, wherein a seal is arranged between the lance and the rotating inlet insert, wherein the lance is supported by a housing of an electric motor and the rotating inlet insert is supported by the lance and the shaft end cap.

2. The system of claim 1, wherein the insert comprises conical ends comprising the plurality of radial passages, wherein the plurality of radial passages is fluidly coupled to a plurality of outer passages arranged on the outer diameter of the insert, between the conical ends, and wherein the center protrudes toward an inlet of the shaft assembly.

3. The system of claim 1, wherein the lance is static and the rotating inlet insert is configured to rotate.

4. The system of claim 1, wherein the shaft assembly is an electric motor shaft assembly.

5. The system of claim 1, wherein the plurality of radial passages is a plurality of first radial passages, further comprising a plurality of second radial passages at an outlet end of the insert, wherein the plurality of second radial passages extend from the outer diameter to the center of the insert.

6. The system of claim 1, wherein the inlet end and an outlet end of the insert are symmetric.

7. The system of claim 1, wherein the insert comprises a circular cross-sectional shape with multiple rectangular slots along its outer perimeter, the insert further comprises a nose at the center of the insert, the nose comprises a truncated cone shape with a domed end.

8. The system of claim 1, wherein the insert comprises a plurality of outer passages extending in an axial direction, a height of the plurality of outer passages is less than a width of the plurality of outer passages.

9. A system, comprising:

an electric motor comprising a housing;

a stator arranged in the housing and surrounding a rotor;

a shaft arranged in the housing and at least partially surrounded by the rotor, wherein the shaft comprises an insert arranged therein, the insert comprising a plurality of radial passages extending from a center of the shaft to an outer diameter of the shaft; and a shaft end cap pressed against an end of the shaft at which the insert is arranged, the shaft end cap comprising an axial passage that extends through an inlet insert and a lance and is configured to direct lubricant to the insert, wherein the lance is supported by the housing and the inlet insert is supported by the shaft end cap, and wherein a square seal is used to seal the lance from the inlet insert, wherein a space is arranged between the square seal, the lance, and the inlet insert configured to flow lubricant from the axial passage to the plurality of radial passages of the inlet insert.

10. The system of claim 9, wherein the plurality of radial passages flow lubricant to an inner race bearing cavity fluidly coupled to a plurality of shaft end cap radial passages.

11. The system of claim 10, wherein the plurality of shaft end cap radial passages direct lubricant to a bearing in contact with the shaft end cap.

12. The system of claim 9, wherein the insert comprises a first conical end with a plurality of first radial passages of the plurality of radial passages and a second conical end, opposite the first conical end, with a plurality of second radial passages of the plurality of radial passages, the insert further comprises a plurality of outer passages fluidly coupled to the plurality of first radial passages and the plurality of second radial passages.

13. A system for an electric motor, comprising:

a shaft;

a shaft end cap; and an insert housed via the shaft and the shaft end cap, the insert comprising a plurality of passages arranged along its outer surfaces configured to direct lubricant from the shaft end cap to a shaft passage arranged in the shaft, the insert further comprising a plurality of radial passages extending from the plurality of passages to a center of the insert, and wherein the insert comprises a first protrusion that interfaces with a first slot of the shaft end cap, the insert further comprises a second protrusion that interfaces with a second slot of the shaft end cap, wherein the first protrusion and the second protrusion are configured to block rotation of the insert.

14. The system of claim 13, further comprising a lance and a rotating inlet insert, wherein the lance is supported by a housing of the electric motor and the rotating inlet insert is supported by the lance and the shaft end cap, wherein an axial passage extends through the lance, the rotating inlet insert, and the shaft end cap.

15. The system of claim 13, wherein the insert comprises a decagonal cross-sectional shape.

16. The system of claim 13, wherein the insert is arranged between a bearing supporting the shaft end cap and a bearing supporting the shaft.

* * * * *